(12) United States Patent
Liu et al.

(10) Patent No.: US 11,297,808 B2
(45) Date of Patent: Apr. 12, 2022

(54) POND CULTURE CIRCULATION SYSTEM BASED ON BIO-TOILET MODULE

(71) Applicant: Shanghai Ocean University, Shanghai (CN)

(72) Inventors: Liping Liu, Shanghai (CN); Kang Li, Shanghai (CN); Wenzhi Shi, Shanghai (CN)

(73) Assignee: Shanghai Ocean University, Shanghai (CN)

( * ) Notice: Subject to any disclaimer, the term of this patent is extended or adjusted under 35 U.S.C. 154(b) by 488 days.

(21) Appl. No.: 16/367,547

(22) Filed: Mar. 28, 2019

(65) Prior Publication Data

US 2019/0297859 A1 Oct. 3, 2019

(30) Foreign Application Priority Data

Mar. 29, 2018 (CN) .......................... 201810270904.4

(51) Int. Cl.
*A01K 63/04* (2006.01)
*A01K 3/00* (2006.01)
*C02F 3/06* (2006.01)
*C02F 3/32* (2006.01)
*A01K 63/00* (2017.01)
*C02F 103/20* (2006.01)

(52) U.S. Cl.
CPC .......... *A01K 63/045* (2013.01); *A01K 63/006* (2013.01); *C02F 3/06* (2013.01); *C02F 3/32* (2013.01); *C02F 2103/20* (2013.01)

(58) Field of Classification Search
CPC .... A01K 63/045; A01K 63/006; A01K 63/04; A01K 63/10; C02F 3/06; C02F 3/32; C02F 2103/20; C02F 2101/20; C02F 2101/16; C02F 2101/105; C02F 2001/007; C02F 3/327; Y02W 10/10
USPC ..... 210/167.22, 602, 747.5, 170.09; 119/211
See application file for complete search history.

(56) References Cited

U.S. PATENT DOCUMENTS

| 4,643,830 | A | * | 2/1987 | Reid | ........................ | C02F 3/301 |
| | | | | | | 210/629 |
| 6,447,681 | B1 | * | 9/2002 | Carlberg | ................ | A01K 63/04 |
| | | | | | | 210/602 |

(Continued)

FOREIGN PATENT DOCUMENTS

| CA | 2000443 A1 | 4/1990 |
| CN | 101461343 A | 6/2009 |
| CN | 101632347 A | 1/2010 |

(Continued)

*Primary Examiner* — Fred Prince (57) ABSTRACT

Disclosed is a pond culture circulation system based on a bio-toilet module including a culture pond and an annular treatment channel surrounding the culture pond. The annular treatment channel is sequentially provided with a sedimentation zone, a biological purification zone and a water storage zone along a direction of water flow. The culture pond includes a plurality of culture pond units. Each of the plurality of culture pond units is provided with a bio-toilet module in communication with the sedimentation zone through a sewage pipe. The water storage zone communicates with each of the plurality of culture pond units through a gravity-flow culvert. The invention further discloses a use method of the pond culture circulation system based on the bio-toilet module.

7 Claims, 10 Drawing Sheets

(56) References Cited

U.S. PATENT DOCUMENTS

| | | | | |
|---|---|---|---|---|
| 7,776,216 B1 * | 8/2010 | Jensen | ............ | C02F 3/327 |
| | | | | 210/602 |
| 2010/0264094 A1 * | 10/2010 | Schwartz | ............ | C12M 23/18 |
| | | | | 47/1.4 |

FOREIGN PATENT DOCUMENTS

| CN | 201816856 U | 5/2011 |
|---|---|---|
| CN | 202618037 U | 12/2012 |
| CN | 103004693 A | 4/2013 |
| CN | 203618566 U | 6/2014 |
| CN | 104211259 A | 12/2014 |
| CN | 204223520 U | 3/2015 |
| CN | 104855327 A | 8/2015 |
| CN | 104872047 A | 9/2015 |
| CN | 105060637 A | 11/2015 |
| CN | 105230551 A | 1/2016 |
| CN | 105417856 A | 3/2016 |
| CN | 105454143 A | 4/2016 |
| CN | 106587493 A | 4/2017 |
| CN | 107381973 A | 11/2017 |
| CN | 107410140 A | 12/2017 |
| CN | 208597551 U | 3/2019 |

\* cited by examiner

POND CULTURE CIRCULATION SYSTEM BASED ON BIO-TOILET MODULE

CROSS-REFERENCE TO RELATED APPLICATIONS

This application claims the benefit of priority from Chinese Patent Application No. CN201810270904.4, filed on Mar. 29, 2018. The content of the aforementioned application, including any intervening amendments thereto, is incorporated herein by reference in its entirety.

TECHNICAL FIELD

The present invention relates to aquaculture, and specifically to a pond culture circulation system based on a bio-toilet module.

BACKGROUND OF THE INVENTION

Pond culture is an important form of aquaculture. By 2015, freshwater pond culture reached to 2.7 million hectares, accounting for 43.94% of the total freshwater aquaculture in China. However, due to the frequent occurrence of aquatic animal diseases, pollution of aquaculture water and wastewater shortages, the aquaculture industry has been seriously affected, and great ecological stress has also been brought to the aquaculture farms and the surrounding environments. Thus, there are more problems in the conventional pond culture remained to be solved. The conventional pond culture is often carried out in a relatively closed area. A culture pond is a living place for cultured lives, but also a decomposition site for wastes such as feces and residual feeds, as well as a culturing place for plankton. Functions of the pond are unclear, and the locations of consumers, producers and decomposers in the pond remain uncertain. This increases the difficulty in management and is prone to ecological imbalance. A main reason for eutrophication of the aquaculture water is the accumulation of nutrients, especially soluble nutrient salts. The external sources of nutrient salts such as nitrogen and phosphorus in the aquaculture water are usually unconsumed feeds during the culturing process, excrement of the cultured lives and agricultural fertilizers that enter the aquaculture water with the water flow. At the same time, in the mode of high-density pond culture, the metabolites and residual feeds produced by the cultured lives cannot be separated and degraded in time, which is more likely to cause eutrophication of the aquaculture water, rapid spread of pathogenic bacteria and biological oxygen consumption. In addition, due to high frequency of water exchange, a large amount of culture tail water rich in nutrient salts is produced. Discharge of the untreated culture tail water into the environment will also cause an increasing ecological stress, thereby eventually affecting the sustainable and healthy development of the aquaculture industry. It can be seen that the conventional pond culture has the disadvantages of easy spread of pathogenic bacteria, wasting water resources, environmental pollution, and high energy consumption and labor cost.

At present, the main methods for preventing the eutrophication of the pond culture water includes physical, chemical and biological methods, such as artificial aeration, excavation of sediments, water diversion and renewal, algae control with chemical reagents and microbial degradation. These methods still involve various defects such as high labor cost and water consumption, and secondary pollution caused by waste water and solid waste. The enclosed circulation aquaculture system is a new culture mode, which has rapidly developed in recent years, can effectively regulate the water quality without causing environmental pollution. In such system, the aquaculture water is treated for recycling by physical filtration, biological purification, sterilization, degasification and oxygen enhancement. However, this culture mode is often applied to industrially valuable aquatic products. In the early stage, a lot of economic inputs are required due to high operating cost and difficulty in maintenance. Therefore, there is an urgent need to design a new self-circulating aquaculture system, which is suitable for the pond culture mode and involves simple operation and maintenance without secondary pollution and high costs.

SUMMARY OF THE INVENTION

An object of the present application is to provide a pond culture circulation system based on a bio-toilet module to solve the above defects in the prior art. Based on "bio-toilet module" and "annular treatment channel", metabolites and residual feeds produced by cultured lives in the culture pond are collected and discharged in time with the water flow to achieve pollution-water separation. As such, a large-scale circulation culture system is provided for separation, purification, storage and reutilization of culture tail water/wastewater to achieve healthy aquaculture, environmental friendliness, resource conservation and increase in output and income.

In a first aspect, the present invention provides a pond culture circulation system based on a bio-toilet module. The system includes a culture pond and an annular treatment channel surrounding the culture pond. The annular treatment channel is sequentially provided with a sedimentation zone, a biological purification zone and a water storage zone along a direction that water flows. The culture pond includes a plurality of culture pond units. Each culture pond unit is provided with a bio-toilet module in communication with the sedimentation zone via a sewage pipe. The water storage zone communicates with the culture pond unit via a gravity-flow culvert.

In an embodiment, an area of the annular treatment channel accounts for 10%15% of culture pond.

In an embodiment, a screen separator is arranged between the biological purification zone and the water storage zone.

In an embodiment, the screen separator has a mesh size of 7-15 cm.

In an embodiment, a first separation wall is arranged between the sedimentation zone and the biological purification zone. The first separation wall is provided with at least one communicating water pipe. The communicating water pipe penetrates through the first separation wall with two ends in communication with the sedimentation zone and the biological purification zone, respectively. The sedimentation zone is used for sedimentation treatment of large particles of waste discharged from the bio-toilet modules in the culture pond units. The sedimentation treatment is to precipitate large particles of waste through residence time, which is suitable for silt and suspended solids.

In an embodiment, height of one end of the communicating water pipe in communication with the sedimentation zone is higher than that of the other end of the communicating water pipe in communication with the biological purification zone. There is a difference in height between the two ends of the communicating water pipe communicating with the sedimentation zone and the biological purification zone. Therefore, when the water level in the sedimentation zone rises to exceed the height of the end of the communicating water pipe in communication with the sedimentation zone, water in the sedimentation zone flows into the biological purification zone via the communicating water pipe. Such height difference also prevents water in the biological purification zone from flowing back into the sedimentation zone through the communicating water pipe.

In an embodiment, a second separation wall is arranged between the water storage zone and the sedimentation zone to separate the water storage zone from the sedimentation zone.

In an embodiment, the biological purification zone is sequentially provided with an emergent aquatic plant zone, a submerged aquatic plant zone and an ecological floating bed zone in a direction that water flows.

In an embodiment, a plant in the emergent plant aquatic zone is reed or *Zizania caductflora*, which is used for adsorbing excess nutrients such as nitrogen and phosphorus in water.

In an embodiment, a plant in the submerged aquatic plant zone is *Elodea nuttallii* or *Ceratophyllum demersum*, which is used for removing nutrients from the water and adsorbing heavy metal elements in water such as arsenic, zinc, copper, cadmium and lead.

In an embodiment, a plant in the ecological floating bed segment is *Eichhornia crassipes* or *Myriophyllum aquaticum*, which floats on the water surface, and is used for removing nitrogen and phosphorus from the water for water purification.

In an embodiment, a bottom of the culture pond unit includes, from the bottom up, a first zone and a second zone. The first zone and the second zone are connected to form a funnel shape with a closed bottom. The first zone is provided with a bio-toilet module, the shape of which matches.

In an embodiment, the first zone is located at a center of the bottom of the culture pond. The first zone is a recess with a shape matching with the bio-toilet module.

In an embodiment, an angle α between a side wall of the second zone and a horizontal direction is 5°-10° to form a slope. This facilitates the accumulation of the sediments to the bio-toilet module in the recess at the center where the first zone is located.

In an embodiment, the recess has a hollow truncated cone shape and a cross section of the recess is tapered from top to bottom. The shape of the recess matches with that of the bio-toilet module, which helps the installation of the bio-toilet module therein.

In an embodiment, a depth of the groove is 130-160 cm.

In an embodiment, a diameter of a bottom of the recess is larger than an outer diameter of a bottom of a main body in the bio-toilet module.

In an embodiment, the bio-toilet module includes a main body in a hollow truncated cone shape, and a cross section of the main body is tapered from top to bottom. A side wall of the main body consists of a plurality of arc plates. Two adjacent arc plates are detachably connected with each other. An upper portion of the main body is provided with a cover plate. A side wall of the cover plate is detachably connected to an upper portion of an inner side wall of each arc plate. A bottom plate is detachably arranged at a bottom of the main body. The cover plate is provided with a sewage pipe mounting port and a plurality of mesh holes. A submersible sewage pump is provided in the main body. A water outlet of the submersible sewage pump communicates with one end of the sewage pipe, and the other end of the sewage pipe penetrates through the cover plate via the sewage pipe mounting port.

In an embodiment, a diameter of the top of the main body is 150-200 cm, and a diameter of the bottom of the main body is 40-60 cm. The height of the body is 120-150 cm.

In an embodiment, the cover plate, the bottom plate and the plurality of arc plates are all made of glass fiber reinforced plastic.

In an embodiment, left and right sides of each arc plate are respectively provided with a connecting portion which includes a receiving portion and a projection. The receiving portion is located at a side of the projection, and is indented relative to the projection. For opposite connecting portions on two adjacent arc plates, the projection of one connecting portion matches with the receiving portion of the other connecting portion.

In an embodiment, the projection of the connecting portion is provided with a plurality of screw holes. For opposite connecting portions on two adjacent arc plates, the screw hole on the projection of one connecting portion corresponds to the screw hole on the projection of the other connecting portion. The screw holes are used for detachable connection between two adjacent arc plates by screws.

In an embodiment, a diameter of the bottom plate is greater than the smallest inner diameter of the main body. The bottom plate is inserted in the bottom of the main body to form a stable structure.

In an embodiment, the diameter of the bottom plate is 4-6 cm greater than the smallest inner diameter of the main body.

In an embodiment, the diameter of the bottom plate is 5 cm greater than the smallest inner diameter of the main body. Specifically, a diameter of the bottom plate is 45-65 cm.

In an embodiment, the bottom plate and the cover plate each are in a circular shape.

In an embodiment, an upper portion of an inner side wall of the arc plate is provided with a plurality of latches. A side wall of the cover plate is provided with a plurality of clamping grooves. Each latch corresponds to each clamping groove.

In an embodiment, the clamping groove includes a mortise and a groove shoulder. The mortise is indented relative to the groove shoulder surrounding the mortise. Each latch includes a tenon and a tenon shoulder. The tenon protrudes from the tenon shoulder. The portion of the tenon protruding from the tenon shoulder matches with the mortise. The cover plate is detachably connected to the arc plate by inserting the latch into the clamping groove.

In an embodiment, the cover plate is located below the top inside the main body at a distance of 3-8 cm. In an embodiment, the cover plate is located below the top inside the main body at a distance of 5 cm.

In an embodiment, the diameter of the cover plate is smaller than the maximum inner diameter of the main body.

In an embodiment, the diameter of the sewage pipe mounting port is 10-18 cm.

In an embodiment, the diameter of the mesh hole is 3-6 cm. The size of the mesh hole is adjusted according to the size of the cultured lives. The mesh hole is square.

In an embodiment, a spacing between two adjacent mesh holes is 1-3 cm.

In an embodiment, the submersible sewage pump is placed on the bottom plate.

In an embodiment, the submersible sewage pump is a cutting type submersible sewage pump.

In an embodiment, a diameter of the sewage pipe is smaller than that of the sewage pipe mounting port.

In a second aspect, the present invention provides a use the method of use of the pond culture circulation system based on a bio-toilet module, which includes:

(1) installing the bio-toilet module at the center of the bottom of the culture pond units; accumulating, in the main body, wastes produced by the cultured lives in the main body to the center of the bottom of the pond by water flow and gravity through the mesh holes on the cover plate; and blocking of the cultured lives by the cover plate from entering the bio-toilet module;

(2) discharging of the tail water containing the waste in the main body regularly, using the submersible sewage pump, from the water outlet of the submersible sewage pump through the sewage pipe to the sedimentation zone of the annular treatment channel for sedimentation treatment; and (3) purifying the tail water after sedimentation treatment sequentially by the emergent plant zone, the submerged plant zone and the ecological floating bed zone of the biological purification zone, and allowing the purified tail water to flow into the water storage zone and then flow back to the culture pond units via the gravity-flow culvert.

In an embodiment, the wastes are feces or residual feeds of the cultured lives.

In an embodiment, the submersible sewage pump is started 1-2 hours after feeding.

The pond culture circulation system based on the bio-toilet module of the invention provides the following beneficial effects.

(1) The pond culture circulation system is designed based on the "bio-toilet module" and the "annular treatment channel". The metabolites and residual feeds produced by the cultured lives are brought into the bio-toilet by the water flow in the culture pond for timely collection and discharge, thereby achieving separation of sewage and water. A closed annular tail water treatment channel is constructed around the culture pond, and the treatment channel is sequentially provided with a sedimentation zone, a biological purification zone and a water storage zone, so that the residual feeds, feces and tail water in the culture pond are treated, and the purified and treated water is reused for culture, forming a large circulation aquaculture system for separation, purification, water storage and reutilization of tail water/wastewater. Therefore, the pond culture circulation system is a safe and eco-friendly aquaculture system due to its healthy aquaculture, environmental friendliness, resource conservation and increase in output and income.

(2) The "pond bio-toilet module" plays a key role in the pond culture circulation system. During the culturing process, the residual feeds and feces settling to the bottom of the pond slide down the slope at the bottom of the pond into the main body of the bio-toilet under the action of gravity and water flow, so that the residual feeds and feces are automatically collected, thereby effectively avoiding the sedimentation of aquaculture pollutants at the bottom of the pond. Then the collected residual feeds and feces are discharged to the sedimentation zone of the annular tail water treatment channel in time by the submersible sewage pump to achieve separation of sewage and water. Therefore, the rapid spread of the pathogenic bacteria caused by the excrement of the cultured lives and the residual feeds is prevented, and the oxygen consumption and eutrophication of aquaculture water caused by the decomposition of the excrement and the residual feeds are reduced; also, the waste of water resources is lowered, so as to achieve a virtuous circle of the aquaculture ecosystem. In addition, the system can enrich the cultured species and reduce the labor intensity, so that it has the advantages of low cost, easy management and low operating and labor cost, etc.

(3) In the pond culture circulation system of the invention, the residual feeds, the feces and the breeding tail water are pumped into the closed annular tail water treatment channel around the culture pond and are physically settled and biodegraded in the sedimentation zone and the biological purification zone. This kind of culture circulation system based on "bio-toilet module" and "annular tail water treatment channel" forms an independent ecosystem which is isolated from the surrounding environment. Specifically, the independent ecosystem cuts off the spread of the pathogenic bacteria in the environment, and enables the timely separation and treatment of the pathogenic bacteria and their carriers in the culture pond. Therefore, the system reduces the disease occurrence, avoids the pollution of the culture tail water to the surrounding ecological environment, and reduces the water demand due to the reuse of the treated water after being pumped back into the culture pond, achieving treatment of the culturing tail water, water resource conservation, no pollution emissions, and prevention of the spread of the exogenous pathogenic bacteria.

(4) The pond culture circulation system of the invention employs aquatic plants to absorb nitrogen, phosphorus and heavy metals by a phytoremediation technology, thereby providing a synergistic effect based on the symbiosis of plants and microorganisms at the root of plant. Through direct absorption of the plants, microbial transformation and physical adsorption and sedimentation, the nitrogen, phosphorus and suspended particles are removed and heavy metal molecules are degraded, so that the sewage is purified.

(5) In the pond culture circulation system of the invention, submerged plants in the treatment channel can not only adjust the cycling speed of the materials in the pond water ecosystem, inhibit the eutrophication of the aquaculture water, control the growth of the algae, improve the transparency and the oxygen condition of aquaculture water, but also facilitate the biodiversity of the pond ecosystem and enhance the stability of aquaculture water environment. During the culturing process, nutrient salts are introduced for supplement due to the nutrient consumption by the submerged plant growth. When the stocking density of the cultured objects matches properly with the density of the submerged plants, the input and output of materials in the pond ecosystem can be maintained for a long time.

In the drawings:
- 1, main body;
- 11, arc plate;
- 111, connecting portion;
- 1111, receiving portion;
- 1112, projection;
- 1113, screw hole;
- 112, latch;
- 1121, tenon;
- 1122, tenon shoulder;
- 2, cover plate;
- 21, sewage pipe mounting port;
- 22, mesh hole;
- 23, clamping groove;
- 231, mortise;
- 232, groove shoulder;
- 3, bottom plate;
- 4, submersible sewage pump;
- 5, sewage pipe;
- 6, first zone;
- 7, second zone;
- 8, recess;
- 9, gravity-flow culvert;
- α, angle between the second zone and the horizontal direction;
- A, culture pond;
- A1, culture pond unit;
- A11, bio-toilet module;
- B, annular treatment channel;
- B1, sedimentation zone;
- B2, biological purification zone;
- B21, emergent plant zone;
- B22, submerged plant zone;
- B23, ecological floating bed zone;
- B3, water storage zone;
- B4, screen separator;
- B5, communicating water pipe;
- B6, first separation wall; and
- B7, second separation wall.

DETAILED DESCRIPTION OF EMBODIMENTS

The present invention will be further described below with reference to the embodiments, so that those skilled in the art can readily understand other advantages and effects of the invention according to the disclosure.

Referring to FIGS. 1-10, it should be understood that the structures, proportions, size, and the like shown in the figures are merely used to cooperate with the contents disclosed in the description for understanding and reading by those skilled in the art, but not to limit the implementation of the present invention. Any modifications of the structure, change in proportion or size made without affecting the effects and the expected purposes of the invention should fall within the scope of the invention. In the meantime, terms "upper", "lower", "left", "right", "center" and "a/an" used herein are for illustration, but are not intended to limit the scope of the invention. Any changes or modifications made to the relative relationship without substantively altering the technical content should also fall within the scope of the invention.

As shown in FIGS. 1-10, the present invention provides a pond culture circulation system based on a bio-toilet module, including a culture pond A and an annular treatment channel B surrounding the culture pond A. The annular treatment channel B is sequentially provided with a sedimentation zone B1, a biological purification zone B2 and a water storage zone B3 along a direction of water flow. The culture pond A includes a plurality of culture pond units A1. Each culture pond unit A1 is provided with the bio-toilet module A11 in communication with the sedimentation zone B1 through a sewage pipe 5. The water storage zone B3 communicates with the culture pond units A1 through a gravity-flow culvert 9.

Figure 1:
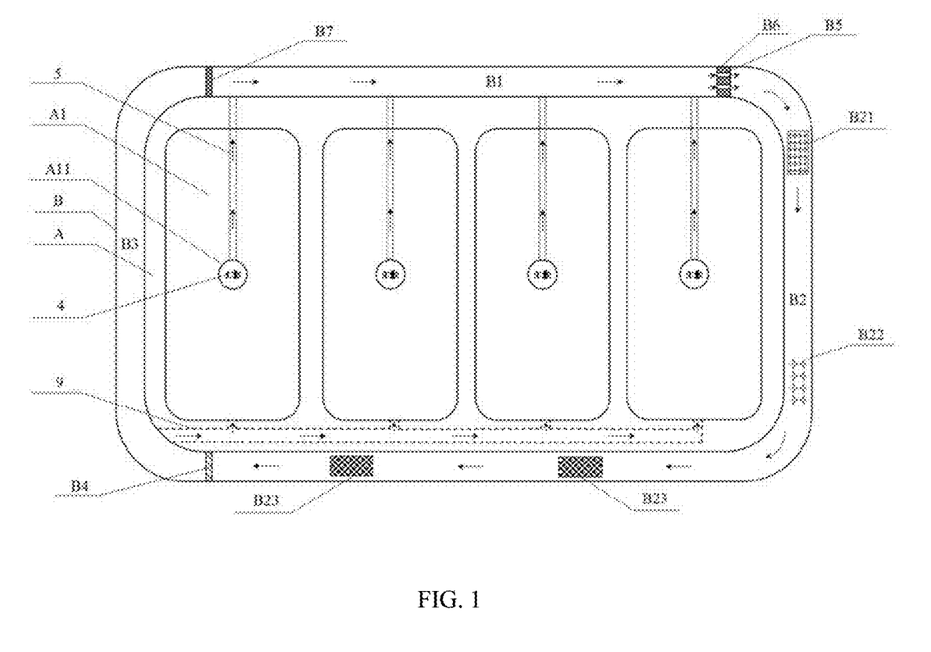
FIG. 1 is a schematic diagram of a pond culture circulation system based on a bio-toilet module according to the present invention.

In a preferred embodiment, as shown in FIG. 1, the area of the annular treatment channel B accounts for 10%-15% of that of the culture pond A.

In a preferred embodiment, as shown in FIG. 1, a screen separator B4 is provided between the biological purification zone B2 and the water storage zone B3. The screen separator B4 has a mesh size of 7-15 cm, which can effectively block the waste in the tail water from entering the water storage zone B3.

In a preferred embodiment, as shown in FIG. 1, a first separation wall B6 is provided between the sedimentation zone B1 and the biological purification zone B2. The first separation wall B6 is provided with at least one communicating water pipe B5. The communicating water pipe B5 penetrates through the first separation wall B6 with two ends respectively in communication with the sedimentation zone B1 and the biological purification zone B2. The sedimentation zone B1 is used for sedimentation treatment of the large-sized waste discharged from the bio-toilet module A11 in each of the culture pond units A1. The sedimentation treatment is to precipitate large particles of waste through residence time, which is suitable for silt and suspended solids.

As shown in FIG. 1, further, the height of one end of the communicating water pipe B5 in communication with the sedimentation zone B1 is higher than that of the other end of the communicating water pipe B5 in communication with the biological purification zone B2. There is a height difference between the two ends of the communicating water pipe B5 between the sedimentation zone B1 and the biological purification zone B2. Therefore, when the water level in the sedimentation zone B1 rises and exceeds the height of the end of the communicating water pipe B5 in communication with the sedimentation zone B1, water in the sedimentation zone B1 flows into the biological purification zone B2 through the communicating water pipe B5. The height difference also prevents water in the biological purification zone B2 from flowing back into the sedimentation zone B1 through the communicating water pipe B5.

In a preferred embodiment, as shown in FIG. 1, a second separation wall B7 is provided between the water storage zone B3 and the sedimentation zone B1 to separate the water storage zone B3 from the sedimentation zone B1, thereby blocking the treated water in the water storage zone B3 from entering the sedimentation zone B1.

In a preferred embodiment, as shown in FIG. 1, the biological purification zone B2 is sequentially provided with an emergent aquatic plant zone B21, a submerged aquatic plant zone B22 and an ecological floating bed zone B23 along the direction of water flow.

Further, a plant grown in the emergent plant zone B21 is reed or *Zizania caductflora*, which is used for adsorbing excess nutrients such as nitrogen and phosphorus in the water. A plant grown in the submerged plant zone B22 is *Elodea nuttallii* or *Ceratophyllum demersum*, which is used for removing nutrients from the water and adsorbing the heavy metal elements such as arsenic, zinc, copper, cadmium and lead in the water. A plant grown in the ecological floating bed zone B23 is *Eichhornia crassipes* or *Myriophyllum aquaticum*, which floats on the water surface, and is used for removing nitrogen and phosphorus from the water to achieve water purification.

Figure 10:
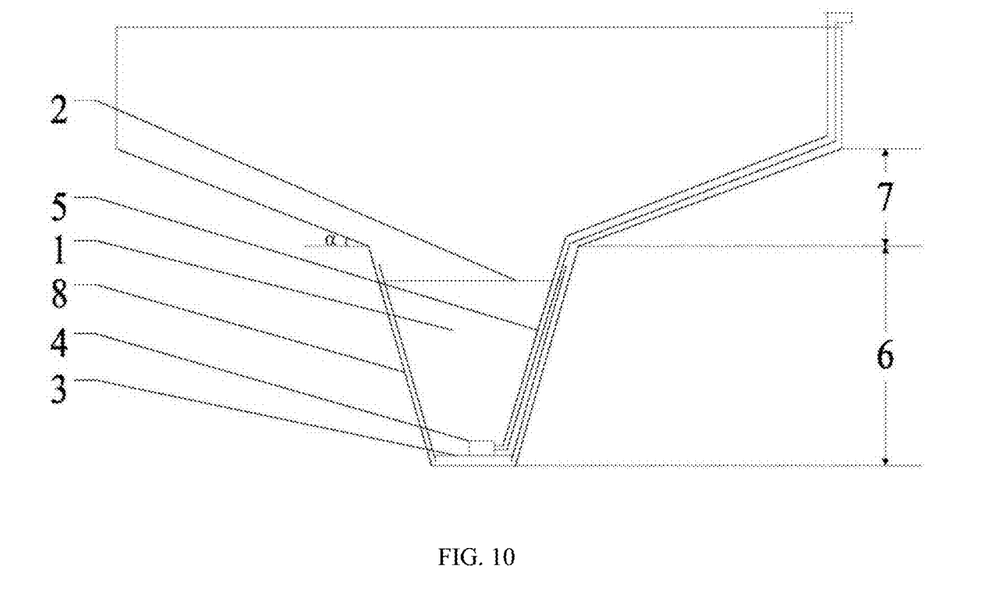
FIG. 10 is a schematic diagram of a culture pond unit with the bio-toilet module in the pond culture circulation system according to the present invention.

In a preferred embodiment, as shown in FIG. 10, a bottom of the culture pond unit A1 includes, from the bottom up, a first zone 6 and a second zone 7, which are connected to form a funnel shape with a closed bottom. The first zone 6 is provided with a bio-toilet module A11, and the shape of the bio-toilet module A11 matches with the first zone 6.

Further, as shown in FIG. 10, the first zone 6 is located at a center of a bottom of the pond. The first zone is a recess 8 with a shape matching with the bio-toilet module A11.

Further, as shown in FIG. 10, an angle α between a side wall of the second zone 7 and the horizontal direction is 5°-10° to form a slope, which facilitates the accumulation of the sediment to the bio-toilet module A11 in the recess 8 at the center where the first zone 6 is located.

Further, as shown in FIG. 10, the recess 8 has a hollow truncated cone shape and a cross section of the recess 8 is tapered from top to bottom. The shape of the recess 8 matches with that of the bio-toilet module A11, which facilitates the installation of the bio-toilet module A11 therein. The recess 8 has a depth of 130-160 cm. A diameter of a bottom of the recess 8 is larger than an outer diameter of a bottom of a main body 1 of the bio-toilet module A11.

In a preferred embodiment, as shown in FIGS. 2-10, the bio-toilet module A11 includes the main body 1 with a hollow truncated cone shape, and a cross section of the main body 1 is tapered from top to bottom. A side wall of the main body 1 consists of a plurality of arc plates 11. Two adjacent arc plates 11 are detachably connected with each other. An upper portion of the main body 1 is provided with a cover plate 2. A side wall of the cover plate 2 is detachably connected to an upper portion of an inner side wall of the arc plate 11. A bottom plate 3 is detachably arranged on a bottom of the main body 1. The cover plate 2 is provided with a sewage pipe mounting port 21 and a plurality of mesh holes 22. A submersible sewage pump 4 is provided in the main body 1. A water outlet of the submersible sewage pump 4 communicates with one end of the sewage pipe 5, and the other end of the sewage pipe 5 penetrates through the cover plate 2 through the sewage pipe mounting port 21.

Figure 2:
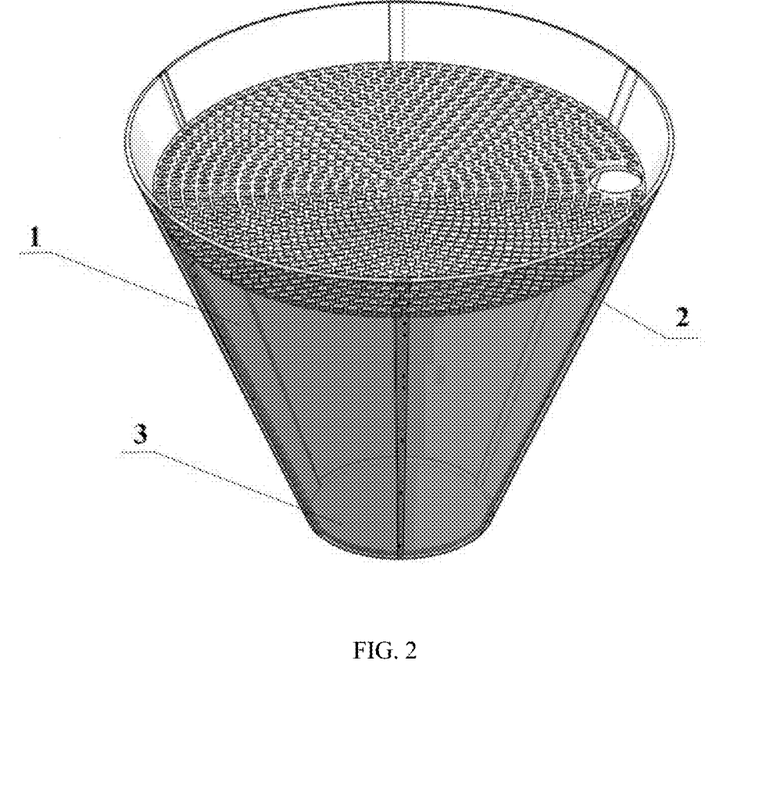
FIG. 2 is a schematic diagram of the bio-toilet module in the pond culture circulation system according to the present invention.
Figure 3:
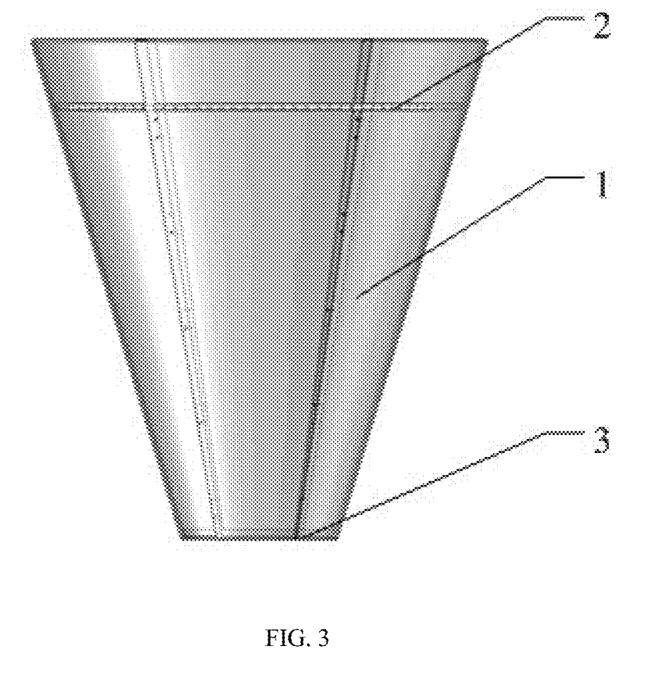
FIG. 3 is a side view of the bio-toilet module in the pond culture circulation system according to the present invention.

Further, as shown in FIGS. 2-3, a top of the main body 1 has a diameter of 150-200 cm, and the bottom of the main body 1 has a diameter of 40-60 cm. The main body 1 has a height of 120-150 cm.

Further, the cover plate 2, the bottom plate 3 and the arc plate 11 are all made of glass fiber reinforced plastic.

Further, as shown in FIGS. 2-4 and 8, left and right sides of the arc plate 11 are respectively provided with a connecting portion 111 which includes a receiving portion 1111 and a projection 1112. The receiving portion 1111 is located on one side of the projection 1112, and is indented relative to the projection 1112. For opposite connecting portions 111 on two adjacent arc plates 11, the projection 1112 of one connecting portion 111 matches with the receiving portion 1111 of the other connecting portion 111 for the engagement of two adjacent arc plates 11.

Figure 4:
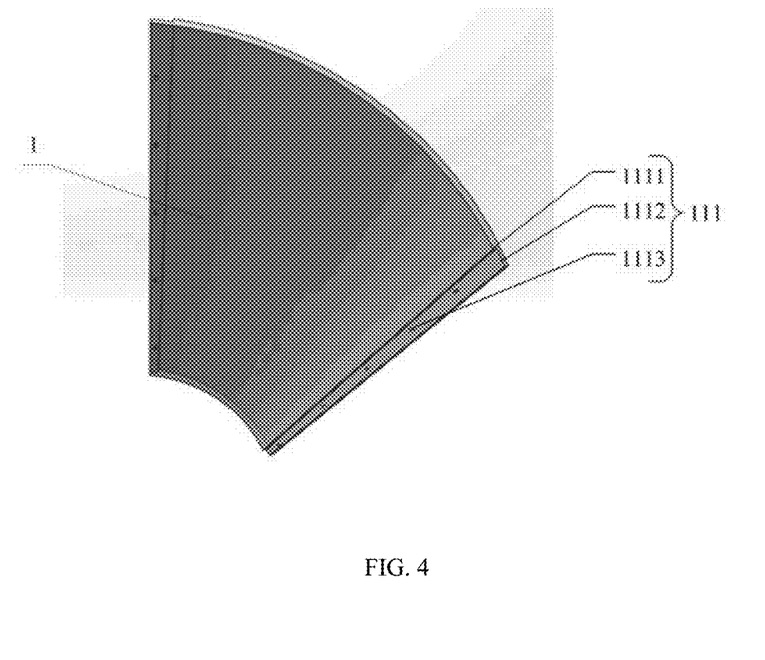
FIG. 4 is a schematic diagram of an arc plate of the bio-toilet module in the pond culture circulation system according to the present invention.
Figure 8:
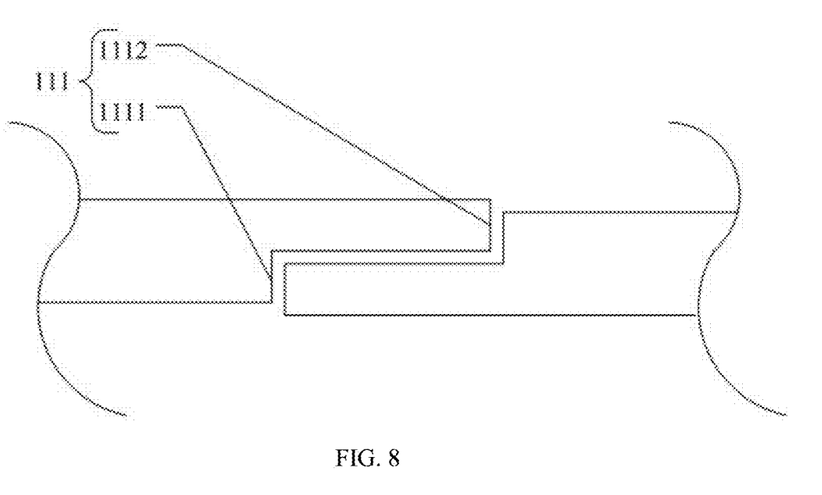
FIG. 8 schematically shows the connection between two connecting portions of two adjacent arc plates of the bio-toilet module in the pond culture circulation system according to the present invention.

Further, as shown in FIGS. 4 and 8, the projection 1112 of the connecting portion 111 is provided with a plurality of screw holes 1113. For opposite connecting portions 111 on two adjacent arc plates 11, the screw hole 1113 on the projection 1112 of one connecting portion 111 corresponds to the screw hole 1113 on the projection 1112 of the other connecting portion 111. The screw hole 1113 is used for detachable connection between two adjacent arc plates 11 by screws.

Further, as shown in FIGS. 2-4 and 10, the diameter of the bottom plate 3 is greater than the smallest inner diameter of the main body 1. The bottom plate 3 is placed in the main body 1 and embedded in the bottom of the main body 1 to form a stable structure, which helps the installation and construction.

Further, as shown in FIG. 10, the diameter of the bottom plate 3 is 4-6 cm greater than the smallest inner diameter of the main body 1, preferably 5 cm. Specifically, the bottom plate 3 has a diameter of 45-65 cm.

Figure 5:
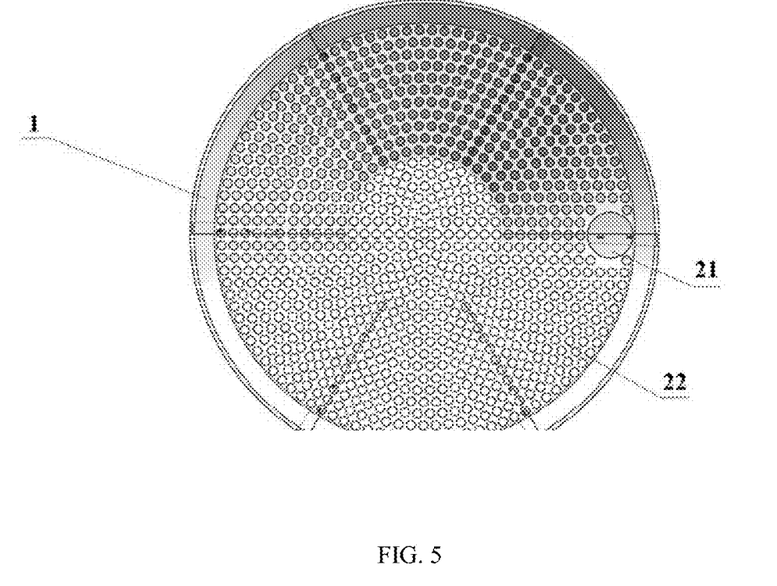
FIG. 5 is a schematic diagram of a cover plate of the bio-toilet module in the pond culture circulation system according to the present invention.

Further, as shown in FIGS. 2, 3 and 5, the bottom plate 3 and the cover plate 2 each are in a circular shape.

Further, as shown in FIGS. 2, 5, 6 and 9, an upper portion of an inner side wall of the arc plate 11 is provided with a plurality of latches 112. A side wall of the cover plate 2 is provided with a plurality of clamping grooves 23. Each latch 112 corresponds to and matches with the each clamping groove 23.

Figure 9:
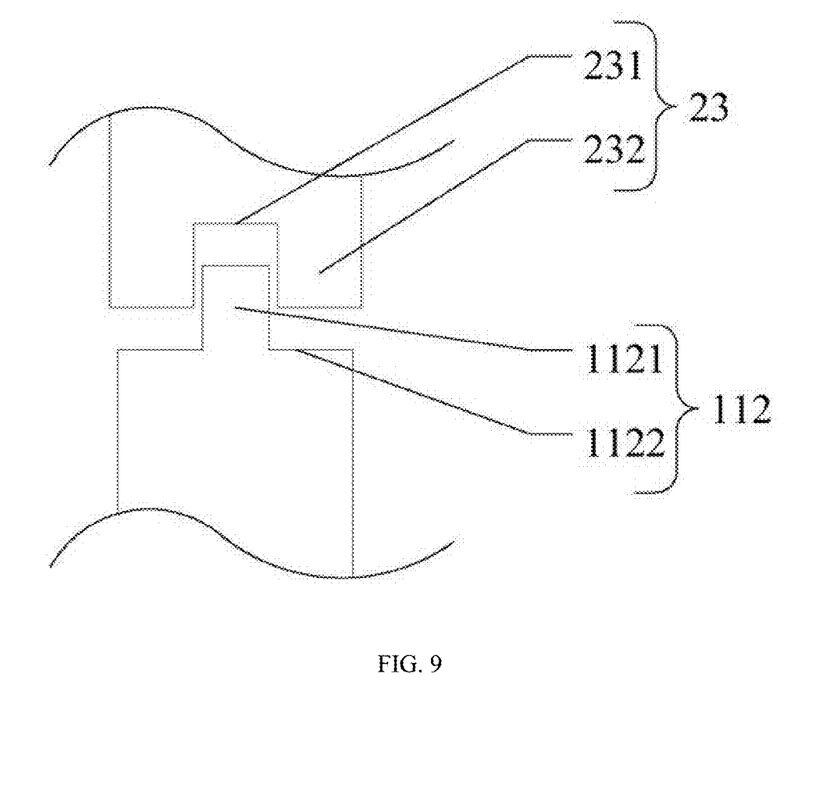
FIG. 9 schematically shows the connection between the arc plate and the cover plate of the bio-toilet module in the pond culture circulation system according to the present invention.

Further, as shown in FIG. 9, the clamping groove 23 includes a mortise 231 and a groove shoulder 232. The mortise 231 is indented relative to the surrounding groove shoulder 232. The latch 112 includes a tenon 1121 and a tenon shoulder 1122. The tenon 1121 protrudes from the surrounding tenon shoulder 1122. The portion of the tenon 1121 protruding from the tenon shoulder 1122 matches with the mortise 231. The cover plate 2 is detachably connected to the arc plate 11 by inserting the latch 112 into the clamping groove 23.

Further, as shown in FIG. 2, the cover plate 2 is located below the top inside the main body 1 at a distance of 3-8 cm, preferably 5 cm.

Further, as shown in FIG. 2, the diameter of the cover plate 2 is smaller than the maximum inner diameter of the main body 1.

Figure 6:
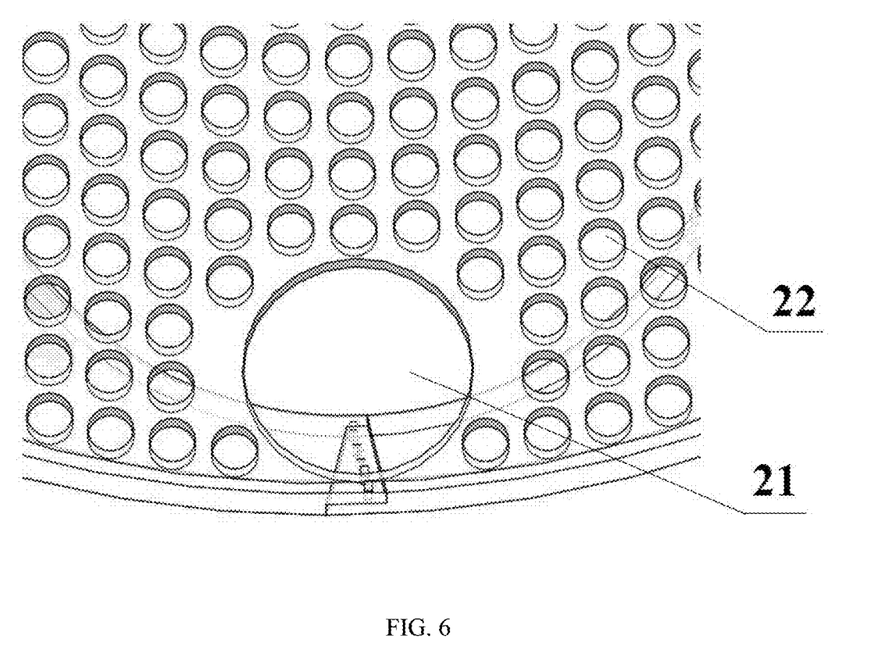
FIG. 6 is a partial view of the cover plate of the bio-toilet module in the pond culture circulation system according to the present invention.

Further, as shown in FIGS. 5 and 6, the sewage pipe mounting port 21 has a diameter of 10-18 cm.

Further, as shown in FIGS. 5 and 6, the mesh hole 22 has a diameter of 3-6 cm. The size of the mesh hole 22 is adjusted according to the size of the cultured lives. A spacing between two adjacent mesh holes 22 is 1-3 cm.

Figure 7:
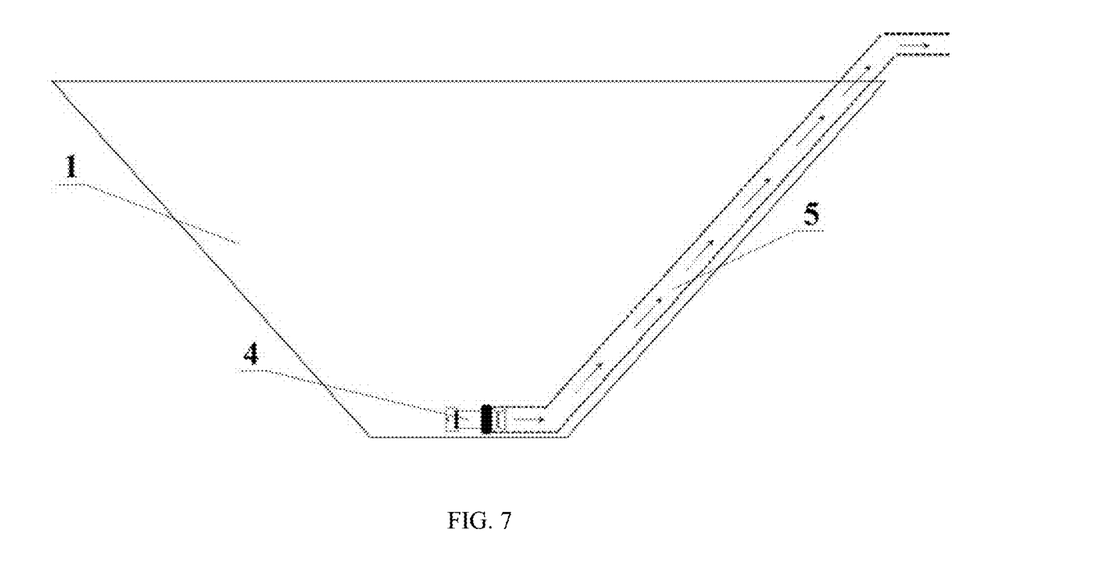
FIG. 7 is a schematic view showing the operation of the bio-toilet module in the pond culture circulation system according to the present invention.

Further, as shown in FIGS. 7 and 10, the submersible sewage pump 4 is placed on the bottom plate 3 and is a cutting type submersible sewage pump.

Further, as shown in FIGS. 5-7, a diameter of the sewage pipe 5 is smaller than that of the sewage pipe mounting port 21.

An operation process of a pond culture circulation system based on a bio-toilet module of the invention will be described below with reference to FIGS. 1-10.

When the pond culture circulation system based on the bio-toilet module as shown in FIGS. 1-10 is available, the bottom of the culture pond unit A1 is modified to form a slope with an angle α of 5°-10° between the second zone 7 at the bottom of the culture pond unit A1 and the horizontal direction. The recess 8 with a depth of 130-160 cm is provided in the first zone 6. Two adjacent arc plates 11 are spliced with each other in a way that the projection 1112 of one connecting portion 111 matches with the receiving portion 1111 of the other connecting portion 111. The two adjacent arc plates 11 are connected by screws through a corresponding structure between the screw hole 1113 on the projection 1112 of one connecting portion 111 and the screw hole 1113 on the projection 1112 of the other connecting portion 111. The remaining arc plates 11 are installed sequentially to finally splice the entire main body 1. Then, the bottom plate 3 is directly embedded into the lower portion of the inner side wall of the main body 1 which is surrounded by the arc plates 11, so that the bottom plate 3 is fixedly mounted at the lower portion of the main body 1 to form a stable structure. The above structure is placed in the recess 8. In the main body 1, the submersible sewage pump 4 is installed and the sewage pipe 5 is laid. The cover plate 2 is inserted into the upper portion of the main body 1, that is, use the clamping groove 23 of the cover plate 2 is spliced with the latch 112 on the upper portion of the inner side wall of the arc plate 11, so that the portion of the tenon 1121 protruding from the tenon shoulder 1122 matches with the mortise 231, thereby fixedly connecting the cover plate 2 with the upper portion of the main body 1. The sewage pipe 5 penetrates through the cover plate 2 through the sewage pipe mounting port 21 and extends out of the culture pond units A1 to the sedimentation zone B1 of the annular treatment channel B.

In the culturing process, the aquaculture wastewater is discharged from the sewage pipe 5 to drive the water in the annular treatment channel B to flow, so that the water could flow back into the culture pond units A1 through the gravity-flow culvert 9, thereby forming a swirling circulation current. In addition, the feces and residual feeds produced by the culture subjects are driven to move and sink to the bottom of the pond. Then the feces and residual feeds slide down the slope of the second zone 7 at the bottom of the pool under the action of gravity and the circulation current, and accumulate in the first zone 6 followed by entering into the main body 1 through the mesh hole 22 on the cover plate 2. At the same time, the cover plate 2 of the bio-toilet module A11 keeps the cultured lives outside of the module to ensure their safety.

The submersible sewage pump 4 is started, and the feces and residual feeds collected in the bio-toilet module A11 are discharged from the culture pond units A1 into the sedimentation zone B1 of the annular treatment channel B from the water outlet of the submersible sewage pump 4 and through the sewage pipe 5. The tail water containing wastes enters the biological purification zone B2 through the communicating water pipe B5 after sedimentation treatment in the sedimentation zone B1, so that excess nutrients such as nitrogen and phosphorus are adsorbed by reed or *Zizania caductflora* in the emergent plant zone B21; nutrients and heavy metal elements such as arsenic, zinc, copper, cadmium and lead are adsorbed by *Elodea nuttallii* or *Ceratophyllum demersum* in the submerged plant zone B22; and nitrogen and phosphorus are further removed by *Eichhornia crassipes* or *Myriophyllum aquaticum* in the ecological floating bed zone B23. Then, the bio-purified tail water flows into the water storage zone B3 through the screen separator B4 and then returns to the culture pond unit A1 via the gravity-flow culvert 9. The above steps are repeated for multiple cycles.

In summary, the invention provides a pond culture circulation system based on a bio-toilet module, which establishes a large-scale circulation aquaculture system for separation, purification, water storage and reutilization of culturing tail water/wastewater, based on the "bio-toilet module" and the "annular treatment channel", enabling healthy aquaculture, environmental friendliness, resource conservation and increase in output and income. Therefore, the present invention effectively overcomes the various defects in the prior art, which is suitable for many applications.

The above embodiments are merely illustrative of the principles and effects of the invention, but are not intended to limit the invention. Any equivalent modifications or variations made to the above embodiments by those skilled in the art without departing from the spirit and scope of the invention should still fall within the scope of the invention defined by the appended claims.

What is claimed is:

1. A pond culture circulation system based on a bio-toilet module, comprising:
   a culture pond, and
   an annular treatment channel surrounding the culture pond;
   wherein the annular treatment channel is sequentially provided with a sedimentation zone, a biological purification zone and a water storage zone along a direction of water flow; the culture pond comprises a plurality of culture pond units; each of the plurality of culture pond units is provided with the bio-toilet module; the bio-toilet module communicates with the sedimentation zone through a sewage pipe; and the water storage zone communicates with each of the plurality of the culture pond units through a gravity-flow culvert;
   the biological purification zone is sequentially provided with an emergent plant zone, a submerged plant zone and an ecological floating bed zone along a direction in which water flows;
   a bottom of each of the plurality of culture pond units comprises a first zone and a second zone from the bottom up; the first zone and the second zone are connected to form a funnel shape with a closed bottom; and the first zone is provided with the bio-toilet module and a shape of the bio-toilet module matches with the first zone; and
   the bio-toilet module comprises a main body with a hollow truncated cone shape, and a cross section of the main body is tapered from top to bottom; a side wall of the main body consists of a plurality of arc plates; two adjacent arc plates are detachably connected with each other; an upper portion of the main body is provided with a cover plate; a side wall of the cover plate is detachably connected to an upper portion of an inner side wall of each of the plurality of arc plates; a bottom of the main body is provided with a bottom plate; the bottom plate is detachably arranged on the bottom of the main body; the cover plate is provided with a sewage pipe mounting port and a plurality of mesh holes; a submersible sewage pump is provided in the main body; a water outlet of the submersible sewage pump communicates with one end of the sewage pipe; and the other end of the sewage pipe penetrates through the cover plate through the sewage pipe mounting port.

2. The pond culture circulation system of claim 1, wherein a screen separator is arranged between the biological purification zone and the water storage zone; and a second separation wall is arranged between the water storage zone and the sedimentation zone.

3. The pond culture circulation system of claim 1, wherein a first separation wall is arranged between the sedimentation zone and the biological purification zone; the first separation wall is provided with at least one communicating water pipe; and the communicating water pipe penetrates through the first separation wall with two ends in communication with the sedimentation zone and the biological purification zone, respectively.

4. The pond culture circulation system of claim 1, wherein an angle a between a side wall of the second zone and a horizontal direction is 5°-10°.

5. The pond culture circulation system of claim 1, wherein left and right sides of the arc plate are respectively provided with a connecting portion; the connecting portion comprises a receiving portion and a projection; the receiving portion is located on one side of the projection; the receiving portion is indented relative to the projection; and for opposite connecting portions on two adjacent arc plates, the projection of one connecting portion matches with the receiving portion of the other connecting portion.

6. The pond culture circulation system of claim 1, wherein an upper portion of an inner side wall of the arc plate is provided with a plurality of latches; a side wall of the cover plate is provided with a plurality of clamping grooves; and each of the plurality of latches corresponds to and matches with each of the plurality of clamping grooves.

7. A use method of the pond culture circulation system of claim 1, comprising:
(1) installing the bio-toilet module at a center of the bottom of the culture pond units; accumulating, in the main body, wastes produced by cultured lives in the main body to the center of the bottom of the pond by water flow and gravity through the mesh holes on the cover plate; and blocking the cultured lives by the cover plate from entering the bio-toilet module;
(2) discharging tail water containing the wastes in the main body regularly, using the submersible sewage pump, from the water outlet of the submersible sewage pump through the sewage pipe to the sedimentation zone of the annular treatment channel for sedimentation treatment; and
(3) purifying the tail water after sedimentation treatment sequentially by the emergent plant zone, the submerged plant zone and the ecological floating bed zone of the biological purification zone, and allowing the purified tail water to flow into the water storage zone and then flow back to the culture pond units via the gravity-flow culvert.

* * * * *